Patented Mar. 1, 1949

2,463,044

UNITED STATES PATENT OFFICE 2,463,044

MOLDING COMPOSITION AND METHOD OF MAKING THE SAME

Earle R. McLean, Pittsburgh, Pa., assignor, by mesne assignments, to The Clark Thread Company, a corporation of Delaware No Drawing. Application November 22, 1944, Serial No. 564,712

21 Claims. (Cl. 106—238)

This invention relates to synthetic molding compositions and to plastic materials molded therefrom.

The primary object of the invention is to provide for the molding of relatively small articles from cheap and easily obtainable raw materials. Another object is to provide a simple and convenient method for preparing a molding composition suitable for such purposes, including cold molding. More specifically, it is an object of the invention to form a molding composition comprising a resin material derived from rosin, and for all practical purposes having the characteristics of a thermosetting material. Other objects will appear in the description of the invention which follows.

While not limited thereto, molding compositions according to the invention are particularly suitable for making products which have a temporary or limited use, such as thread spools, bottle caps, paper tape cores, and the like, one of the chief values of the product being its cheapness, which enables it in one form to compete with turned wood articles of similar simple shapes and sizes. Thus a molding composition composed of, for example, rosin and a filler material such as wood flour, may be molded into articles possessing wood-like properties. For example, a thread spool can be made which looks like a wood spool. Various simulated wood articles can be produced, depending upon the kind of wood filler employed in the composition. Similarly, other fillers may be employed with equal efficacy to simulate a variety of materials other than wood, as, for example, the use of powdered stone to simulate harder articles. For present purposes, the invention will be described utilizing a wood filler to produce an article simulating wood.

Ordinarily, when starting with a resin derived from rosin, some times referred to as a rosin resin and a filler such as wood flour, the resulting molding composition is a thermoplastic material, i. e., upon heating it becomes more plastic. Such material, to be molded, must be molded cold, or, if molded hot, the mold must be cooled before ejection of the sample. According to the present invention, the molding composition obtained is thermosetting, i. e., upon heating it sets to a more rigid form.

Briefly stated, the invention in its preferred form comprises adding to a suitable filler to form a homogeneous mass an emulsified mixture obtained by diluting a rosin resin emulsion with water, adding to said diluted emulsion an aqueously dispersed basic alkaline earth metal compound, and diluting the resulting mixture with water to a desirable concentration to form the said emulsified mixture. The homogeneous mass is then dried at a controlled temperature, granulated, and molded to form a desired product.

The above-stated manner of incorporating the filler with the resin-alkaline earth metal compound emulsion mixture has been found to be particularly suitable. The filler, such as wood flour, is gradually wetted by the said emulsion mixture until, upon complete addition of the latter, there is formed a porous, easily pulverized mass or crumb. This method of mixing will be referred to herein as emulsion mixing.

Various filler materials may be used. Suitable organic fillers include wood flour or sawdust derived from various kinds of wood, wood pulp, shredded paper waste, cotton flock, and the like. Inorganic fillers include kieselguhr, precipitated calcium carbonate, ground glass, glass fibres, ground stone, and the like.

The resin may be crude rosin as obtained from certain woods, or it may be a purified rosin, such as commercial "limed rosin"; or polymerized, or heat-treated rosin may be used. Abietic acid anhydride, which is contained in rosin, and abietic acid, derived from any source, and other naturally-occurring materials containing these compounds, may be used as the resin ingredient. All of the foregoing resinous materials should be in the form of an emulsion for best results in the practice of this invention.

Suitable alkaline earth metal compounds comprise the oxides or hydroxides of calcium, barium, strontium or magnesium. Calcium compounds work particularly well, and in addition are the least expensive.

The homogeneous mass above referred to may be dried in the bulk state but preferably the mass is extruded in spaghetti-like forms which can be handled more easily in the drier. The drying of the composition or mass is an operation which requires careful control, because too high a drying temperature will yield a composition which is unmoldable. Temperatures up to about 60° C. can be used without injury to the molding composition. Lower temperatures may be used but the drying rate is slower.

The composition may be molded cold or hot. In cold molding, which is the preferred method due to its higher production rate, the composition is placed in the mold of any suitable press and subjected to high compression, for example, at pressures up to 20,000 p. s. i. By moderately heating the mold it is possible to reduce substantially the required molding pressure. The molded product is hard and has a laminated structure which renders it strong and of good impact resistance.

In the hot molding process the composition may be molded at a pressure of about 2,000 to about 4,000 p. s. i. and at a temperature of about 100 to about 140° C. The composition is converted under these conditions to a dense hard solid. The mold may be opened hot and the sample ejected or the mold may be cooled before ejection. The product of the hot molding process has a still greater strength and a higher density than that obtained in the cold molding process and may be considered preferable for some special purposes.

The reaction or reactions which may occur in the described process are not fully understood, but it is thought that the thermosetting character of the molding composition (as distinguished from the thermoplastic property normally to be expected to result from the use of a rosin resin) is the result of the formation of a metallic salt or "resinate" having a considerably increased melting point, compared to the melting point of any known rosin resin or rosin derivative.

In general the effectiveness of the molding compositions of this invention, may be said to be based on the reaction in an aqueous medium of a resin derived from abietic acid or rosin in a dispersed or emulsified state with a dispersion of insoluble alkaline earth metal oxides or hydroxides, or other basic alkaline earth metal compounds.

The procedure generally used was to stir a powdered or aqueously dispersed basic alkaline earth metal compound into a dilute (about 10 to 40%) resin emulsion. On first contact of the alkaline earth metal compound with the resin emulsion there was formed a thick dispersion but on further stirring the dispersion became uniform and could be diluted to any desired concentration. The dispersion or emulsion may comprise metal "resinate," unreacted resin, and unreacted alkaline earth metal compound. Organic or inorganic coloring agents may be added to the dispersion at this point; or, as will be understood, the desired color may be achieved by pre-dyeing the wood flour. The emulsion dispersion was then diluted to a suitable concentration and compounded with the wood flour. The resulting uniformly mixed composition was then dried.

Lubricants such as metallic stearates may be mixed with the dry molding composition to improve the molding properties, but such lubricant is not generally necessary.

It was found that by incorporating a small amount of catalyst in the dried composition prior to molding, the molding time could be reduced without impairment of the quality of the molded product. The catalyst probably influences "resinate" formation in the mold. Calcium salts of low molecular weight organic acids, such as calcium acetate, and similar derivatives of barium and strontium may be employed as catalysts. Experiments showed that if the catalyst was incorporated in the resin emulsion a composition resulted which was not moldable. This was due, it is believed, to an excessive conversion of resin to the "resinate." Use of a catalyst favors stronger and denser products.

It was further found that an excess of alkaline earth metal compound did not materially change the molding or molded properties of the resinate molding composition. These properties are also independent, in the case of calcium oxide of the lime activity, defined as the rate at which the lime will slake.

A general formula for preparing the molding composition of this invention is as follows:

80 to 150 parts of a 20 to 40% resin emulsion in which the resin may be rosin or a resin derived from rosin is diluted with water and from 40 to 60 parts of powdered alkaline earth metal oxide or hydroxide or other basic alkaline earth metal compound is stirred in. On a weight ratio basis, these amounts correspond to 0.666 to 3.75 parts of basic alkaline earth metal compound to 1 part of resin. More water is added to make a smooth cream. If a coloring agent is employed, this is added in amounts varying, say, from 10 to 40 parts as may be desirable. The resulting emulsion dispersion is then diluted with enough water so that the total weight of water added does not exceed the weight of the dry materials or ingredients used, including the wood filler. The diluted emulsion is then stirred into the wood filler until a homogeneous mixture is obtained. The resulting crumb is extruded and dried. The temperature at which the drying (and also, of course, the mixing operation) takes place is held substantially below the melting point of the resin. For instance, with a resin melting at 100° C., the temperature should not exceed about 60° C. Excessive temperatures during the mixing tend to cause the emulsion to split or break down and in the drying impair the molding properties of the composition. The dry material is then reground and, if desired, is blended with sufficient lubricant and catalyst. It is then ready to be molded. (All parts are by weight.)

For a resin emulsion containing about 10 to 40% resin, the weight ratio of basic alkaline earth metal compound to resin, above referred to, may vary from 0.666 to 7.50 parts of compound to about 1 part of resin.

A typical example of the method of this invention in its application to hot molding is as follows:

100 grams of 40% rosin resin emulsion was diluted with 50 grams of water and 40 grams of powdered calcium oxide (lime) was stirred into the emulsion. The concentrated emulsion was then diluted with water so that a total of 300 grams of water was present and the diluted emulsion was compounded gradually into 236 grams of birch wood flour filler (80 mesh). The resulting crumb was extruded, dried at 50° C., mixed with a small quantity of calcium acetate, and reground. This molding composition was molded at 3500 p. s. i. pressure and a temperature of 135° C. for 5 seconds.

The density of the molded material produced according to this invention may vary from 1.20 to 1.35 depending on the molding conditions and the variations in the molding compositions. Large amounts of inorganic coloring pigments, of course, will raise the density but for unpigmented compositions the stated density range will prevail.

In light of the foregoing description, the following is claimed:

1. A molded composition which comprises the composition described in claim 19 molded at about 2000 to about 4000 p. s. i. and about 100 to about 140° C.

2. A molded composition which comprises the composition described in claim 20 molded at about 2000 to about 4000 p. s. i. and about 100 to about 140° C.

3. A process for making a molding composition which comprises diluting a resin emulsion with water, said resin being selected from the class consisting of rosin, abietic acid, and abietic anhydride, adding thereto a basic alkaline earth metal compound in a weight ratio of 0.666 to 7.50 parts of said compound to about 1 part of said resin to form an emulsified dispersion, adding the emulsified dispersion to a finely divided filler to form a homogeneous mixture, drying said mixture, said process being carried out at a temperature substantially below the melting point of the resin.

4. A process for making a molding composition which comprises diluting a rosin resin emulsion with water, adding thereto an aqueously dispersed basic alkaline earth metal compound in a weight ratio of 0.666 to 7.50 parts of said compound to about 1 part of said resin to form a uniform emulsified dispersion, diluting the latter with water to form a smooth cream, adding a coloring agent to said cream and diluting the cream to form an emulsified concentrate, adding said emulsified concentrate to a finely divided filler to produce a homogeneous mixture, extruding said mixture into small forms, and then drying the forms under controlled temperature condition substantially less than the melting point of the resin.

5. Process according to claim 4, in which the drying temperature is below 60° C.

6. A process for making a molded product which comprises diluting a rosin resin emulsion with water, adding thereto an aqueously dispersed basic alkaline earth metal compound in a weight ratio of 0.666 to 7.50 parts of said compound to about 1 part of said resin to form a uniform dispersion, diluting said uniform dispersion with water, adding the diluted dispersion to a finely dvided filler to form a homogeneous mixture, drying said mixture under controlled temperature condition substantially less than the melting point of the resin, granulating the dried mixture and then molding it into a product.

7. A process for making a molded product which comprises diluting a rosin resin emulsion with water, adding thereto an aqueously dispersed basic alkaline earth metal compound in a weight ratio of 0.666 to 7.50 parts of said compound to about 1 part of said resin to form a uniform dispersion, diluting said uniform dispersion with water to form a smooth cream, adding a coloring agent to said cream and diluting the cream to form a concentrate, adding said concentrate to a finely divided filler to produce a homogeneous mixture, extruding said mixture into small forms, drying the forms under controlled temperature condition substantially less than the melting point of the resin, granulating the dried forms, blending therewith a lubricant and a catalyst to facilitate molding, and then molding the resulting mixture.

8. Process according to claim 7, in which the drying temperature is below 60° C.

9. Process according to claim 7, in which the drying temperature is below 60° C., and in which the molding step is performed at about 2000 to about 4000 p. s. i. and about 100 to about 140° C.

10. A process for making a molded product which comprises diluting with water 80 to 150 parts by weight of a 10 to 40% rosin resin emulsion, adding thereto 40 to 60 parts by weight of powdered lime at a temperature substantially below the melting point of the rosin to form a uniform emulsified dispersion, diluting the latter with water to form a concentrate, adding said concentrate to a wood flour filler to form a porous, easily pulverized mass, extruding said mass into small forms, drying the forms at a temperature substantially below the melting point of the rosin, granulating the dried forms and then molding the same.

11. Process according to claim 7 in which the catalyst is calcium acetate.

12. The reaction product of about 1 part by weight of rosin and 0.666 to 7.50 parts by weight of a basic alkaline earth metal compound, said reaction product having been produced at a reaction temperature substantially below the melting point of the rosin.

13. The reaction product of about 1 part by weight of a resin and 0.666 to 7.50 parts by weight of a basic alkaline earth metal compound, said resin being selected from a member of the class consisting of abietic acid, abietic anhydride, and rosin, said reaction product having been produced at a reaction temperature substantially below the melting point of the resin.

14. The reaction product of an aqueously dispersed resin emulsion with a basic alkaline earth metal compound, said resin being derived from a member of the class consisting of abietic acid, abietic anhydride, and rosin, said basic alkaline earth metal compound and resin having been reacted in a weight ratio varying from 0.666 to 7.50 of said compound to about 1 of said resin and at a reaction temperature substantially below the melting point of the resin.

15. Molding composition according to claim 14 in which the basic alkaline earth metal compound is an alkaline earth metal oxide.

16. Molding composition according to claim 14 in which the basic alkaline earth metal compound is calcium oxide.

17. A molding composition as described in claim 14 in which the resin emulsion contains about 10 to 40% resin.

18. A mixture comprising the reaction product of a resin emulsion with a basic alkaline earth metal compound, said resin being selected from a member of the class consisting of abietic acid, abietic anhydride, and rosin, said basic alkaline earth metal compound and resin having been reacted in a weight ratio varying from 0.666 to 7.50 of said compound to about 1 of said resin and at a reaction temperature substantially below the melting point of the resin said mixture also comprising any unreacted resin and unreacted basic alkaline earth metal compound.

19. A thermosetting molding composition which consists essentially of a reaction product of an aqueous rosin emulsion with a basic alkaline earth metal compound, and a filler, said alkaline earth metal compound and rosin being employed in a weight ratio varying from 0.666 to 3.75 of said compound to about 1 of said rosin, and said reaction product having been produced at a reaction temperature substantially below the melting point of the rosin, said molding composition having been dried at a temperature substantially below the melting point of the rosin.

20. A molding composition which consists essentially of a filler and the reaction product of a basic alkaline earth metal compound with an emulsified resin, said resin being selected from the class consisting of abietic acid, abietic anhydride, and rosin, said alkaline earth metal compound and resin being employed in a weight ratio varying from 0.666 to 7.50 of said compound to about 1 of said resin, and said reaction product having been produced at a reaction temperature substantially below the melting point of the resin, said molding composition having been dried at a temperature substantially below the melting point of the resin.

21. Method of making a thermosetting compound which consists in reacting about 1 part by weight of a thermoplastic material selected from the group consisting of rosin, abietic anhydride, and abietic acid with 0.666 to 7.50 parts by weight of a basic alkaline earth metal compound to produce a reaction product which sets to a more rigid form upon heating, said reaction being carried out at a temperature substantially below the melting point of the thermoplastic material.

EARLE R. McLEAN.

REFERENCES CITED

The following references are of record in the file of this patent:

UNITED STATES PATENTS

| Number | Name | Date |
|---|---|---|
| 19,006 | Merrymon | Dec. 29, 1857 |
| 239,794 | Hyatt | Apr. 5, 1881 |
| 303,213 | Cooke | Aug. 5, 1884 |
| 449,874 | Euricht | Apr. 7, 1891 |
| 539,928 | Wheeler | May 28, 1895 |
| 1,428,120 | Scheel | Sept. 5, 1922 |
| 1,910,318 | Boorne | May 23, 1933 |
| 2,143,413 | Ellis | Jan. 10, 1939 |
| 2,237,973 | Price et al. | Apr. 8, 1941 |